United States Patent
Yannone et al.

(10) Patent No.: US 6,822,583 B2
(45) Date of Patent: Nov. 23, 2004

(54) METHOD FOR PASSIVE "360-DEGREE COVERAGE" TACTICAL FIGHTER TARGET TRACKING INCORPORATING ADAPTIVE PILOT MANEUVER CUE PROCESSING

(75) Inventors: Ronald M. Yannone, Nashua, NH (US); Edward F. Toohey, Lynnfield, MA (US); Melvin Carroll, Franklin, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 29 days.

(21) Appl. No.: 10/217,024

(22) Filed: Aug. 12, 2002

(65) Prior Publication Data

US 2004/0027257 A1 Feb. 12, 2004

(51) Int. Cl.[7] .............................................. G08B 21/00
(52) U.S. Cl. ...................................... 340/945; 701/223
(58) Field of Search ............................ 340/945; 702/5; 701/176, 223

(56) References Cited

U.S. PATENT DOCUMENTS

| | | | |
|---|---|---|---|
| 5,208,757 A | * | 5/1993 | Appriou et al. ............. 701/223 |
| 5,408,541 A | | 4/1995 | Sewell |
| 5,838,262 A | | 11/1998 | Kershner et al. |
| 6,043,867 A | | 3/2000 | Saban |
| 6,484,101 B1 | * | 11/2002 | Lucas et al. .................... 702/5 |
| 6,487,519 B1 | * | 11/2002 | O'Neill et al. .............. 702/176 |

OTHER PUBLICATIONS

Kirubarajan, et al.; Bearings–Only Tracking Of Maneuvering Targets Using A Batch–Recursive Estimator; IEEE Transactions on Aerospace and Electronic Systems; vol. 37. No. 3; Jul. 2001.

* cited by examiner

*Primary Examiner*—John Tweel
(74) *Attorney, Agent, or Firm*—Barry L. Haley

(57) ABSTRACT

A method and system to rapidly, passively, estimate target range, speed and heading for non-maneuvering and maneuvering radio frequency airborne emitters (enemy targets and threats) for tactical fighters using batch based recursive estimators for track initialization and track maintenance that includes providing information processing that operates on interferometer cosine (cone angle) measurements, and estimated SNR (signal-to-noise ratio) data, threat database, and feedback information from pilot maneuver cue algorithm. The present method will initialize airborne tracks using varying degrees of real time and a priori information to quickly estimate coarse airborne emitter heading using real time interferometer cosine (cone angle) measurements and provide pilot aircraft maneuver cues that will accelerate passive range (target speed and heading estimates) convergence. The system includes pilot maneuver cue processing which computes airborne emitter (target and threat) initial heading and corresponding accuracy to determine if sufficient accuracy is available to present the pilot with the proper pilot cue.

1 Claim, 1 Drawing Sheet

METHOD FOR PASSIVE "360-DEGREE COVERAGE" TACTICAL FIGHTER TARGET TRACKING INCORPORATING ADAPTIVE PILOT MANEUVER CUE PROCESSING

BACKGROUND OF THE INVENTION

1. Field of the Invention

The present invention relates generally to aircraft such as tactical fighters that can employ passive technology for early target detection and target tracking, and specifically to an improved method that enhances the implementation of tactical fighter configuration data and sensor assets for passively tracking maneuvering or non-maneuvering airborne RF emitters, which represent targets or threats, to enhance the tactical fighter's ability to intercept and destroy incoming targets.

2. Description of Related Art

Modern warfare requires the airborne defense of military and civilian targets, typically by tactical fighters, whose job it is to seek out and destroy incoming enemy aircraft seeking to destroy friendly military and civilian complexes, whether on ground or at sea. At the current speeds and aircraft stealth configurations of potential target aircraft, there exists a critical need for rapid but accurate passive target range, speed, and heading estimates (with quality factors) in order to prioritize incoming aircraft threats for purposes of avoidance and targeting. The complex problem requires a total integration of all of the tactical fighter's onboard and remote (offboard) assets. The entire fighter weapon system, which includes remote support help with satellite and ground communications, and radar, must be completely integrated and used with all the onboard aircraft avionics equipment, including ownship and linked wingmen weapons systems to maximize the ability of the tactical fighter to totally avoid, or to destroy enemy targets.

A very important aspect of current warfare for airborne weapon systems is to employ passive avionics systems and multispectral LO (low observable) technology to avoid detection by the oncoming targets. Present fighter aircraft do not possess a passive ranging system that leverages the electronic warfare subsystem as the primary ingredient—with exploitation of all available onboard and offboard data. The prior art shows in U.S. Pat. No. 5,408,541 issued Apr. 18, 1995, a method and system for recognizing targets at long ranges. One of the drawbacks of the system described in this patent is the fact that it is not completely passive, and it does not take advantage of all of the weapon system assets available. It involves a gated television sensor coupled with an active laser—neither of which are aboard the fighter configuration for which the invention approach discussed herein has available. Namely, it does not exploit the onboard EW (electronic warfare) system as its prime source of passive measurements.

U.S. Pat. No. 6,043,867 issued Mar. 28, 2002, shows a tracking system that includes a means for early target detection that uses the passive infrared tracking capability of infrared radiation emitted from a flying target and for generating a succession of line-of-sight (LOS) or LOS rate signals that are stored in a database. The electromagnetic finder in the system is configured to operate at first detection threshold for receiving relatively low magnitude reflections. Estimations are made of LOS and soft-stage data, facilitating early steering of the interceptor for dually homing onto the target. Again, there is no bootstrapping of the entire ownship system capabilities to solve the overall problem. It also involves an EM range finder that can be sensed by the target—using optical augmentation equipment and hence "active"—and not totally passive. The equipment are not aboard the fighter aircraft for which the invention described herein is addressing. Particularly, the invention described in U.S. Pat. No. 6,043,867 issued Mar. 28, 2002 is for an interceptor missile that utilizes passive and active tracking mechanisms—and whose flight dynamics tend toward proportional navigation (maintaining a constant line-of-sight).

The successful operation and maneuvering of a tactical fighter in an actual battle scenario places a tremendous amount of work on the pilot to accomplish a successful operation, avoiding, and/or intercepting and destroying an enemy bomber or fighter aircraft. In addition to the safe operational management of the aircraft itself, there is the requirement of a continuous and instantaneous management of the weapon systems, especially the early warning detection of threats/targets to allow ownship (and possibly cooperating action of a wingmen) to achieve target interception in the most efficient and potentially successful manner. The air-air battlespace of today, and the future, has become one that necessitates passive operation and the use of LO (low observability) management.

Thus, two aircraft, ownship and wingmen, have configuration data and sensor assets which can be used for passively detecting, initializing potential target tracks and provide passive target range, speed and heading estimates with confidence to the initialized tracks and to provide the mechanism to maintain or drop tracks, for both non-maneuvering and maneuvering incoming airborne RF emitters, which could be either threats (defensive posture) or real targets (offensive posture).

The present invention provides for a solution of this problem, which includes providing a method and system for a flyable airborne RF emitter (friendly/unfriendly) location solution in the cockpit by bootstrapping batch maximum likelihood (ML), probabilistic data association filter (PDAF), and recursive interacting multiple model (IMM) methodologies that use 1) the electronic warfare aperture assets such as embedded antennas within the aircraft structure, 2) the electronic warfare interferometer measurements, such as the cosine of cone angle, 3) pulse descriptor word (PDW) data, 4) a priori mission data, 5) real-time mission constraints, and 6) available real time track information from other onboard avionics and off-board information sources. By utilizing the present invention, the entire weapon system on board ownship and wingmen abilities are enhanced to attain the most rapid and accurate passive target range, speed, and heading estimates and their associated quality values.

The present invention involves the enhancement and modification in order to bootstrap the approach presented in IEEE paper entitled "Bearings—Only Tracking of Maneuvering Targets Using a Batch Recursive Estimator," published in IEEE *Transactions On Aerospace And Electronic Systems*, Volume 37, No. 3, Jul. 2001. The paper approach describes a batch recursive estimator for tracking maneuvering targets from bearings-only measurements in clutter, such as low signal-to-noise ratio targets. The IEEE paper examines the sonar application. This invention requires extensive reshaping for airborne application. The approach was used to combine batch maximum likelihood probabilistic data association (ML-PDA) estimator with the recursive interacting multiple model (IMM) estimator with probabilistic data association (PDA) to result in better tracking initialization, as well as track maintenance results in the presence of clutter. The methodology describes also how batch a recursive estimator can be used for adaptive decisions for ownship maneuvers based on target state estimation to enhance target observability.

The present invention provides a method and system that can bootstrap the approach presented in this article to greatly enhance passive airborne RF target range, speed, and heading convergence for an airborne RF emitter. The present invention also deals with the inner workings of the interacting multiple model. A novelty of the invention is the "pilot maneuver cue processing" that provides the pilot the optimal maneuver to perform passive ranging subject to the critical constraints of (a) time-allotted for the ranging solution, (b) current ownship speed and heading with respect to the threat/target, (c) current ownship multispectral LO (low observability) contour map 'presented' to the target/threat, (d) real-time, tightly-coupled IR/EO defensive aid suite missile (SAM—surface-to-air; AAM—air-to-air) launch status, and (e) IFDL (intra-inter flight data link) data that indicates where adjacent wingmen are.

The high level block diagram defining the IEEE AES paper is shown in FIG. 1. The methodology discloses track initialization (maximum likelihood probabilistic data association filter) and track maintenance (interacting multiple model PDAF with amplitude information) pieces. The real time measurement inputs are noisy angle measurements and signal amplitude. The output is a range estimate and quality factor. This approach will be limited and range conversion slow. The IEEE AES paper approach does make for an excellent basis to develop the invention by bootstrapping architecture as described below for the passive airborne electronic warfare problem. When looking at FIG. 1, the IEEE AES paper approach shows angle and signal amplitude data, which is fed to a track initialization and track maintenance data. The final result is range estimate and quality factor. One of the limitations is that in the IEEE AES paper, only the angle and signal amplitude data are used—and has not been applied to passive onboard electronic warfare measurements, other available onboard avionics measurement and track information, the a priori threat data base, the air battlespace and target types. The internal design parameters are fixed, so no real time adaptive capability is presently used.

In current tactical fighter aircraft, for pilot situational awareness, there are various pilot cues that are provided via the heads-up display and other cockpit information devices that clearly show numerous variables to the pilot concerning the status of the aircraft and its attitude (roll, pitch, yaw). Using the pilot maneuver cue algorithm and the information given to the pilot, both in ownship and wingmen, with the present invention, an entire mission system's functionality can be provided that takes advantage of all the information available to passive ranging processing.

SUMMARY OF THE INVENTION

A method and system for a tactical fighter aircraft to enhance RF airborne emitter target interception and early detection that uses the tactical fighter configuration data and sensor assets for passively initializing target tracks to provide passive target range, speed and heading estimates with a quality factor for each parameter estimated for insertion into the electronic warfare track file. The system and method can to maintain or drop tracks for any maneuvering or non-maneuvering airborne RF emitter representing targets or threats, resulting in rapid, accurate, passive range estimates for threat prioritization that incorporates all of the tactical fighter assets available for the problem's solution.

The method utilizes a threat database that includes all a priori information about the threats (i.e., their sensor/weapon suites, flight envelope) angle and signal amplitude (estimated SNR—signal-to-noise ratio) data to the target, relevant real-time ownship inertial data, and feedback from the pilot maneuver cue processing function. The output of the information processing function includes the ML-PDAF track initialization generator that is based on the IEEE article. The information processing also has an output that includes a feed forward path and an output that goes to the pilot maneuver cue processing.

The entire system provided includes and interacts with the overall tactical fighter platform Mission Systems function that is integrated into the total operation of the aircraft—and between aircraft (wingmen).

The track initialization data output goes to the IMMPDAFAI track maintenance system that itself has a feedback provision. The information processor also has a feed forward path into the IMMPDAFAI. The IMMPDAFAI has an output of target range (along with target speed and heading) estimate and corresponding quality factors that are presented to the pilot maneuver cue processing and to the tactical fighter mission platform functions within the aircraft.

The present methodology utilizes pilot maneuver cue processing that receives information from the information processing unit and, in turn, provides pilot optimized maneuver cues for rapid and continuous situational awareness, which include ±G-levels, the selection of either a (a) two-turn or (b) sinusoid ownship maneuver—and for the sinusoidal ownship maneuver includes two heading values, and two time values. The pilot maneuver cues are used for setting up the optimal ownship maneuver, (subject to constraints cited earlier) that will optimize rapid estimates of target range, speed, and heading, along with their quality factors.

By bootstrapping and implementing the IEEE-AES process described for target tracking, the present invention provides an enormous amount of information for enhancing the passive threat avoidance and engagement capability.

For example, the information processing unit will get ownship inertial data that includes the tactical fighter's speed, heading, stored RCS (radar cross-section) 'signature' contour map, IR/EO 'signature' contour map, flap motion tables under various loading conditions, G-level, the electronic warfare aperture locations, and ownship bank angle data. The information processing unit will also have access to the a priori onboard threat database and cosine (cone angle) measurements, as well as signal amplitude (estimated signal-to-noise ratio) data and other data within the electronic warfare PDW (pulse descriptor word).

The pilot maneuver cue processing receives outputs from the track maintenance and from information processing unit to provide pilot maneuver cues that are critical to rapidly, passively provide target range, speed and heading estimates and to maintain a track file for multiple airborne RF emitters (threats and/or targets).

The information processing unit will incorporate multiple aircraft cosine (cone angle) measurements and RF pulse descriptor word (PDW) measurements via the intra/inter flight data link (IFDL). These data will be used to correlate the measurements (e.g., cosine (cone angle)), estimated SNR (signal-to-noise ratio), SEI (specific emitter ID on the threat/target radar) to correlate the measurements with the developed file over time, elevation data when available and mission-related information to compute the course estimates of target range, speed and heading to the target emitter from ownship aircraft, along with the wingmen, as well as the use closed-form two ship ranging expressions. This uses interferometer cosine (cone angle) measurement accuracy, the base leg separating the ownship from wingmen, and the cosine (cone angle) measurements.

The tactical fighter Mission Systems function receives a request from the information processing unit for any available range information to the target from any onboard or offboard asset.

The information processing unit can request from Mission Systems of the tactical fighter function any other data that could result in incorporating into the information processing function more accurate onboard infrared (IR) angle measurements and their amplitude data (and sensor statistics—probability of detection and false alarm) by correlating this data with the ELECTRONIC WARFARE RF measurements to feed the ML-PDAF. This would enhance convergence of range estimates by using highly-accurate sub-milli radian azimuth and elevation measurement accuracy, as well as the airborne threat/target emitter heading and velocity estimates and as feed-forward information to the pilot maneuver cue processing. The information processing unit includes a feed-forward path to the pilot maneuver cue processor and a feedback path back to the information processor.

The information processing unit also can augment very rough, coarse, range estimates, such as a range "no further than" by using known threat airborne target (emitter) RF mode transitions, such as acquisition-to-track, the ownship RCS (radar cross-section) "presented" to the emitter at the angle measured, the particular airborne emitter ratio of "known range to the fourth-root of a known radar cross section" of the ownship.

The information processing unit also feeds ML-PDAF emitter signals pulse descriptive word signal-to-noise ratio estimate to assist track formation and feed forward the SNR to the IMMPDAFAI for adaptive track maintenance.

The information processing unit utilizes on board stored data files regarding threat airborne platform identification, such as the anticipated target, type of aircraft belonging to the enemy, the target emitter identification, such as a certain type of enemy radar, known weapons that the target could be carrying, the lethal envelope and the tactical deployment, which all can aid in range inferencing and threat prioritization and pilot cues.

The information processing unit also modifies IMM parameters based on real time data and mission related information, such as adding adaptivity to the model switching transition priorities, process noise (Q-matrix) levels for the individual airborne emitter platform dynamics models, measurement error covariance (R-matrix) values, sample interval values (T) used, probability of detection parameter (PD), the number of data points used in the batch ML (maximum likelihood) track initialization segment, and coast the tracks of the target (extrapolate their position in inertial space and increase their corresponding uncertainty) when the measurements are known to be unavailable as in ownship maneuvers that place the airborne emitter outside the interferometer field of view by feeding the forward FOV issue to the IMMPDAFAI function where the Kalman filter banks are located.

In summary, the information processing unit and the algorithms used therein form the basis for implementing the MLPDAF track initialization and the IMMPDAFAI track maintenance processing discussed in the IEEE-AES approach.

The second major processor used in the present invention is pilot maneuver cue processing, which provides cues to the pilot to execute the optimal passive ranging maneuver. The pilot maneuver cue processing computes the target airborne emitter heading and corresponding accuracy to determine if there is sufficient knowledge available to present the pilot in ownship with proper pilot maneuver cue. The pilot maneuver cue processing provides the pilot the G-level, the direction of turn, the maneuver flight path preferred (2-turn or sinusoid), and if the sinusoid maneuver 4 parameters (H1/H2, T1/T2)—where H1/H2 are initial heading and subsequent heading angles and T1/T2 are the straight-leg lengths for the first and subsequent straight legs. The 2-turn ownship maneuver consists of two 90 degree turns in tandem in opposite directions such that when the 2-turns are completed, the maneuver ends with ownship flying in the same heading as when it started the maneuver. The second ownship maneuver is the sinusoid with several variants. It is defined by the algorithm to include two heading angles and two straight leg time values. The first heading angle veers ownship off its original course, and then the ownship flies straight for a number of seconds to be determined. The second heading angle is prescribed to turn the ownship in the opposite direction, across its original heading line. The second time value, which is to be determined, is of an indicated duration of subsequent straight legs the ownship needs to fly. If the accuracy in threat/target heading feedback is connected into the tactical fighter Mission System's function platform and feedback to the information processing unit to indicate that more time is needed and that if another sensor asset can be assigned to aid threat/target heading accuracy, that then the system should do so. The sensor assets include off board sources that the Mission System can utilize either through a request or possible control. This closed-loop architecture is an important ingredient in the invention.

Thus, utilizing the present invention by bootstrapping the original track initialization and track maintenance described in ML-PDAF and IMMPDAFAI, the present invention provides a method and system that utilizes and includes information processing and pilot maneuver cue processing that are tied into the tactical fighter Mission Systems which provides to the pilot the maximum amount of information from all of the different information sources available on ownship in order to get line-of-sight angles and range estimates for airborne emitter targets in a passive environment for ownship amidst a low signal-to-noise ratio environment.

It is an object of this invention to provide a method and Electronic Warfare-based system in tactical aircraft to greatly enhance passive range convergence in a real time incorporation of all available information regarding the target to rapidly initialize detection and tracks of the target.

It is another object of the invention to provide the pilot real-time maneuver cues to provide target range, speed and heading estimates and their quality factors using all available assets that ownship and remote sources can provide.

And yet another object of the invention is for rapid, accurate, passive range estimates for threat prioritization for a tactical fighter that utilizes total incorporation of the tactical fighter's information assets for a weapon system. Namely, although Mission Systems may request passive ranging on several airborne threats, based on the estimates received, Mission Systems will determine the threat priority and thus only critical threat information will be presented to the pilot.

In accordance with these and other objects which will become apparent hereinafter, the instant invention will now be described with particular reference to the accompanying drawings.

PREFERRED EMBODIMENT OF THE INVENTION

In the preferred embodiment, the scenario would be a modern tactical fighter, which would be ownship, typically in conjunction with a second tactical fighter, which would be the wingman, operating in a military environment that would include mission resources from remote observation, which could be land-based or shipboard-based or airborne-based or a combination of all, that provides information independently and transfers that information into the tactical fighter Mission Systems function. The goal is to provide to the pilot of ownship the maximum amount of integrated tactical information that is used to rapidly, passively obtain range and track a maneuvering airborne target for interception to prevent airborne targets and emitters from reaching friendly forces and resources.

Figure 1:
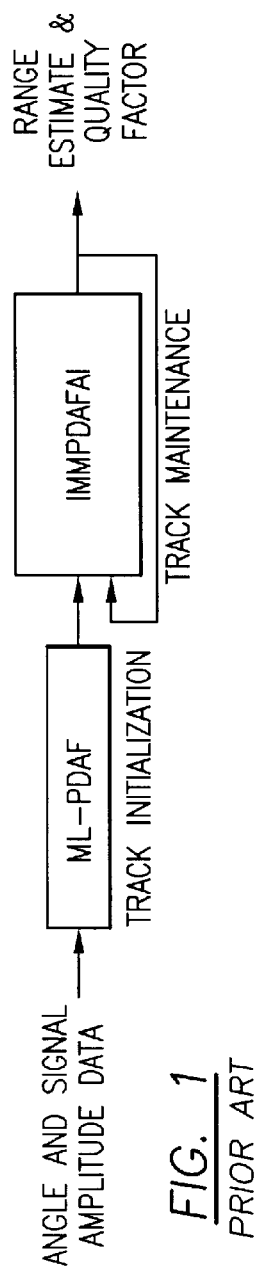
FIG. 1 shows a schematic diagram of a bearings only tracking of maneuvering targets using batch recursive estimators described in IEEE Transactions On Aerospace And Electronic Systems, Volume 37, No. 3, July 2001. This was shown in the prior art.

As discussed above, when shown in FIG. 1, the present invention utilizes batched base ML-PDAF and recursive IMM approach to a solution of the problem. The problem being solved by the methodology algorithms and processes contained herein and described provide for the tactical fighter a passive multi-sensor and a priori information based airborne emitter threat information (e.g., known weapons onboard aircraft, weapon's envelope, etc.) process and algorithm.

Figure 2:
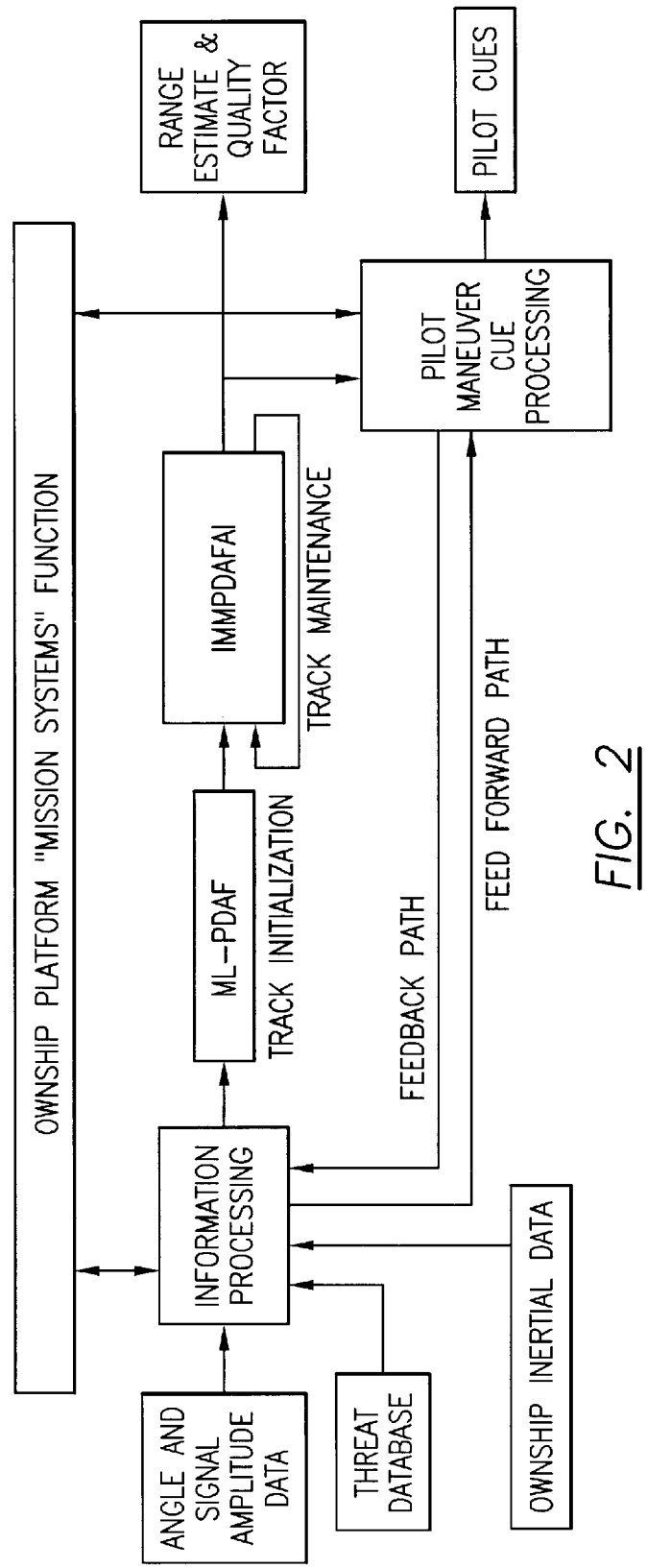
FIG. 2 shows a schematic diagram of the present invention.

FIG. 2 shows the present invention that forms part of a tactical fighter platform mission system function, which would be onboard ownship aircraft in conjunction with all the resources available at remote locations for feeding information to the ownship. The problem faced by the pilot in the cockpit is to obtain as quickly and early as possible (i.e., at the greatest range), target detection, and track initialization and track maintenance. This allows the pilot/ownship to either avoid or intercept the target as far away from friendly sources as possible in the shortest amount of time or other constraints. Certainly the sooner the target is detected and a track is established, the faster threat avoidance or intercept can be scheduled, allowing for more reactive time by the pilot. The system shown in FIG. 2 shows that at the heart of the system is an information processing unit that "communicates" back and forth between the ownship's Mission Systems function. The information processing unit obtains ownship inertial data that includes speed, heading, Radar Cross Section contour map, infrared (IR)/EO contour map, aircraft flap motion tables, G-level, electronic warfare aperture locations, and aircraft bank angle considerations. This information is also sent to the pilot maneuver cue processing as part of the overall information provided to the pilot.

Of paramount importance, of course, is to get angle and electronic warefare PDW information, coupled with estimated SNR signal to noise ratio data and threat a priori database information, into the information processing unit. This can also be supplemented by information from the tactical fighter Mission System function. It is very important also that the information processing unit have a feed-forward path into the pilot maneuver cue processing, and likewise, have a feedback path from the pilot maneuver cue processing into the information processing unit for air-air passive ranging problem solution. The information processing unit can incorporate multiple aircraft angle and radio frequency PDW measurements via the IFDL intra/inter flight data link. These data are utilized for correlation of the angle information and to compute coarse estimates of range to the target from both wingmen, along with a computed accuracy value via a closed-form two ship ranging expression. These ranging expressions are using the interferometer angle measurement accuracy, base leg separating the wingmen, and the angle measurements. It is very important that during this process the ownship can request from Mission Systems any available range information that uses off-board sources, including satellites, ground stations, or other platforms. This is an important source of data that can be utilized to solve the target problems through the information processing unit. The Mission System's can support the electronic warfare based passive ranging algorithm better accuracy with the onboard infrared azimuth and elevation angle measurements and the corresponding IR amplitude data, which is correlated with the electronic warfare RF measurements that feed the ML-PDAF shown in FIG. 2. This enhances convergence of the range estimates by using sub-miliradian azimuth and elevational angle measurement accuracy, along with the airborne target heading and velocity estimates. This is used as feed-forward information to the pilot maneuver cue processing. Obviously, the pilot aircraft maneuver response is the final result and goal of the system to achieve the most efficient and successful avoidance or intercept of the threat/target. multiple aircraft angle and radio frequency PDW measurements via the IFDL intra/inter flight data link. These data are utilized for correlation of the angle information and to compute coarse estimates of range to the target from both wingmen, along with a computed accuracy value via a closed-form two-ship ranging expression. These ranging expressions are using the interferometer angle measurement accuracy, base leg separating the wingmen, and the angle measurements. It is very important that during this process the ownship can request from Mission Systems any available range information that from offboard sources, including satellites, ground stations, or other platforms. This is an important source of data that can be utilized to solve the target problem through the information processing unit. The Mission Systems can support the electronic warfare based passive ranging algorithm better accuracy with the onboard infrared azimuth and elevation angle measurements and the corresponding IR amplitude data, which is correlated with the electronic warfare RF measurements that feed the ML-PDAF shown in FIG. 2. This enhances convergence of the range estimates by using sub-miliradian azimuth and elevation angle measurement accuracy, along with the airborne target heading and velocity estimates. This is used as feed-forward information to the pilot maneuver cue processing. Obviously, the pilot aircraft maneuver response is the final result and The information processing unit provides coarse range estimates which could be such as a range that goes "no further than," by using known threat airborne emitter radio frequency mode transitions (e.g., acquisition to track), the ownship radar cross section presented to the emitter at the angle measured, the particular airborne emitter ratio of known range to the fourth root of a known radar cross section of the ownship.

As shown in FIG. 2, the information processor feeds the ML-PDAF emitter signals PDW signal to noise ratio estimate to assist track formation and feed forward the signal to noise ratio to the IMMPDAFAI connected as an output to the ML-PDAF. The IMMPDAFAI also includes information feedback concerning the track maintenance.

Ownship on-board data files regarding enemy target platform identification, weapon, aircraft/emitter linkage, and kinematic information. This would be based on the typical targets that are known to be threats. Other information that could be stored that would be very important is the lethal envelope and threat tactical weapons deployment to provide range inferencing, threat prioritization, and pilot maneuver cues. This information can be stored as shown in FIG. 2 in the threat database for providing to the information processing unit.

One of the important functions of the present invention is to use the information processing unit to modify IMM parameters based on a real time data and mission related information. Examples are adaptively altering to the model switching transition probabilities, the cue matrix process noise levels for each individual airborne target emitter platform dynamics model, the measurement air covariance R-matrix values, sample interval values used, the probability of detection parameter PD, the number of data points used in the batch ML, track initialization segment as shown in FIG. 2, and provide the tracks by extrapolating their position in inertial space and increasing their corresponding uncertainty when measurements are known to be unavailable as to ownship maneuvers that place the airborne emitter target outside the interferometer field-of-view by feeding forward the field-of-view information to the IMMPDAFAI as shown in FIG. 2 where the Kalman filter banks are located.

As shown in FIG. 2, there is also a feed-forward path from the information processing unit into the IMMPDAFAI. The output and interaction of the present system is shown that includes IMMPDAFAI outputs to the pilot maneuver cue processing that provides threat/target range, speed, and heading estimates and their quality factors. The pilot maneuver cue processing interacts with Mission Systems platform functions.

The goal is to provide the fighter pilot the benefit of all information available to ownship with the result being to solve the problem of either avoiding or intercepting the threat/target as early (i.e., at the furthest standoff range) as possible and provide early track initialization and track maintenance as possible to allow for more rapid problem solution for threat/target avoidance or interception and destruction. The information that is shown in FIG. 2 and the processing of all the information available to ownship results in providing for the pilot maneuver cue processing whose task is to compute the airborne target heading and corresponding accuracy to determine if sufficient accuracy is available to present the pilot with the proper pilot maneuver cue. These pilot maneuver cues include ownship maneuver type, the G-level and direction (left/right)-initial ownship heading and, if the sinusoidal ownship maneuver is determined as the appropriate maneuver, two heading angles and two straight leg durations are provided to the pilot. For use in the invention, ownship maneuvers include a two-turn maneuver and a sinusoidal flight path maneuver. The two-turn ownship maneuver would be two 90 degree turns in tandem in opposite directions, with the ownship flying on the same heading at the end of the maneuver. The second ownship maneuver would be the sinusoid with several variants. This would be defined by the algorithm to include two heading angles and two straight leg time values. With the first heading angle, the ownship will veer off its original course and then it will fly straight for a given amount of time. The second heading angle will turn the ownship in the opposite direction, crossing its original heading line, for a predetermined time value. If there is insufficient knowledge in the threat/target heading, feedback to the tactical fighter Mission Systems and the information processing unit will tell the system that more time is needed and that if another sensor asset can be assigned to aid heading accuracy, that the system should do so. These sensor assets can include off-board resources that Mission Systems can request or even control. The closed-loop architecture is a critical ingredient of the invention.

In the adaptive solution to the problem, the electronic warfare based passive ranging processing will use all available information being processed through the information processing unit to initialize tracks and for track maintenance, as well as provide the pilot with the optimal passive ranging maneuver cue. By bootstrapping different parts of the track initialization and track maintenance problem, it is believed that the present invention will initialize airborne tracks using varying degrees of real time and a priori information and the uncertainty of this information. This allows the electronic warfare based passive ranging algorithm to quickly estimate airborne emitter range, speed, and heading using the real time electronic warfare apertures (linear array interferometers) and other sources of angle information, the angle measurements accuracy, and mission constraints to provide the ownship pilot maneuvering cues that will provide rapid passive range convergence. Using the present invention, the electronic warfare based passive ranging algorithm and electronic warfare system hardware will maintain track when the airborne emitter maneuvers using angular measurements, pulse descriptor word (PDW) data and inferencing.

The result of the invention is to rapidly, passively range and track maneuvering airborne emitters (targets and threats) for tactical fighters by providing a new approach to the batch base recursive approach.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method to rapidly, passively range and track maneuvering and non-maneuvering airborne emitters for tactical fighters that includes batch (series of cosine of cone angle measurements and signal to noise data) based maximum likelihood probabilistic data association filter (MLPDAF) for track initialization and interacting multiple model (IMM) estimators for track maintenance, comprising the steps of:

providing track initialization by providing and including an ML-PDAF filter;

providing track maintenance using interacting multiple model PDAF with amplitude information;

providing information processing connected to the input of said track initialization filter, which includes threat database information, angle and estimated signal-to-noise ratio data, and ownship inertial data;

providing the pilot the optimal maneuver cue that optimizes passive estimation of target range, heading, and speed (along with their quality factors) subject to the critical constraints of (a) time alloted for the ranging solution, (b) current ownship speed and heading with respect to the threat/target, (c) current ownship multi-spectral LO (low observability) contour map 'presented' to the target/threat, (d) real-time, tightly-coupled IR/EO defensive aid suite missile (SAM—surface-to-air; AAM—air-to-air) launch status, and (e) IFDL (intra-inter flight data link) data that indicates where adjacent wingmen are:

providing radio frequency airborne emitter track information; and maintaining track whenever the airborne emitter target or threat maneuvers using either solely electronic warfare asset measurements and/or supplemented by Mission Systems-provided onboard track file data or offboard information.

* * * * *